United States Patent [19]

Epstein

[11] Patent Number: 6,023,510
[45] Date of Patent: Feb. 8, 2000

[54] METHOD OF SECURE ANONYMOUS QUERY BY ELECTRONIC MESSAGES TRANSPORTED VIA A PUBLIC NETWORK AND METHOD OF RESPONSE

[75] Inventor: Michael A. Epstein, Spring Valley, N.Y.

[73] Assignee: Philips Electronics North America Corporation, New York, N.Y.

[21] Appl. No.: 08/998,046

[22] Filed: Dec. 24, 1997

[51] Int. Cl.$^7$ .................................. H04L 9/00; H01J 13/00
[52] U.S. Cl. .......................... 380/25; 380/49; 395/200.59
[58] Field of Search .................. 380/25, 49; 395/200.59

[56] References Cited

U.S. PATENT DOCUMENTS

| | | | |
|---|---|---|---|
| 5,420,926 | 5/1995 | Low et al. | 380/24 |
| 5,535,276 | 7/1996 | Ganesan | 380/25 |
| 5,604,803 | 2/1997 | Aziz | 380/25 |
| 5,727,156 | 3/1998 | Herr-Hoyman et al. | 395/200.49 |
| 5,732,137 | 3/1998 | Aziz | 380/25 |
| 5,815,665 | 9/1998 | Teper et al. | 395/200.59 |

OTHER PUBLICATIONS

Schneier, Bruce, (1996). Applied Cryptography Second Edition: protocols, algorithms, and source code in C, Published by John Wiley & Son, Inc.

Stallings, William, (1995). Network and internetwork security: principles and practice, Published by Prentice–Hall, Inc.

Primary Examiner—Tod R. Swann
Assistant Examiner—Todd Jack
Attorney, Agent, or Firm—Dwight Renfrew

[57] ABSTRACT

A method for secure anonymous querying by a user of an information provider by electronic mail and for obtaining a reply uses a public key of the provider to form an electronic encrypted query package containing information including a query, a generated random number sequence, a hash of the query, a generated public key of the user, and an identification of a public bulletin board. The query package is preferably sent to the provider via a network from a public terminal. At the information provider the query package is received and decrypted. If the result of hashing the decrypted query is equal to the decrypted hash, a response R is formulated. A response package is formed therefrom by using a generated symmetric key of the information provider and the public key of the user. The response package is posted to the public bulletin board along with the random number sequence. The public bulletin board is accessed by the user in an anonymous manner and the response package, which is identified by the random number sequence, is downloaded and decrypted to obtain response R.

16 Claims, 2 Drawing Sheets

METHOD OF SECURE ANONYMOUS QUERY BY ELECTRONIC MESSAGES TRANSPORTED VIA A PUBLIC NETWORK AND METHOD OF RESPONSE

BACKGROUND OF THE INVENTION

1. Field of the Invention

The present invention relates to methods for users to communicate securely and anonymously with information providers by electronic messages transported via a public network, and to methods of secure response to such messages.

2. Description of the Related Art

Communications by electronic messages sent over a public network such as the Internet in clear text are vulnerable to being examined by an eavesdropper monitoring the network. Consequently, there is the risk that an electronic message which contains an inquiry and/or response of private information in the clear could fall into the hands of a malicious person. This is particularly worrisome where the inquiry relates to a disease affected with a substantial social stigma, such as AIDS, in which case even just the knowledge of who has made an inquiry to an AIDS testing and/or counseling service could produce great harm.

It is known from U.S. Pat. No. 5,509,064 that a person after anonymously mailing a physical specimen produced with an at-home test kit to a medical test facility can obtain a test result by accessing an automated call handling and routing system and entering a unique personal identification code which came with the test kit.

Such a method is limited to actual mailing of physical material in a sealed envelope or package without a return address, which is assumed to be both secure and anonymous. Further, the call handling and routing system is not amenable to detailed responses to submitted queries.

With regard to communication by secure messages over the Internet, the Internet community has established a standard for Internet Privacy-Enhanced Mail (PEM) (RFCs 1421 through 1424, obtainable at ftp://ftp.rsa.com/pub/). However, this standard does not deal in general with the possibility of secure messages being anonymous, and more importantly, with provisions for reply to anonymous secure messages.

Also, anonymous remailers for electronic mail are known for the purpose of forwarding messages from a message originator to a recipient, with all message header information which could be used to trace the message back to its source replaced by information which just points back to the anonymous remailer. It is possible that the message sent to the remailer for forwarding could be an encrypted one, but the destination address would be in the clear because such remailers are generally not set up to receive and decrypt an encrypted destination address. Consequently, an eavesdropper monitoring electronic mail messages sent to a remailer could determine both actual source and destination addresses. Also, because the remailer must necessarily retain the source addresses of message originators in order to enable replies to be forwarded, there is the risk that the source addresses could be obtained if the remailer were compromised.

There is a need to communicate securely and anonymously by transport of electronic messages over a public network such as the Internet to make inquiries and obtain responses thereto, particularly in relation to obtaining information pertaining to health.

SUMMARY OF THE INVENTION

It is an object of the present invention to provide a method for queries in the form of electronic messages to be submitted securely and anonymously to an information provider via a public network, such as the Internet, and to provide a method for secure responses by the information provider which are obtainable by the inquiring party.

Briefly, these and other objects are satisfied by a method, which from the point of view of the user, is for secure anonymous querying of a provider in which:

a random number sequence, a public key of the user, and a corresponding private key of the user are generated;

a public key of the provider is used to form an electronic encrypted query package containing information including a query, the generated random number sequence, and the generated public key of the user, the information including an identification of a public bulletin board for posting a message comprising the random number sequence in association with an encrypted response to the query, and the query package being structured such that the contained information can be obtained by the provider by operations including a decryption with the private key of the provider; and the query package is sent to the provider via a network in a manner that the user is not identifiable to the provider.

Other aspects of the inventive method from the point of view of the user are that the query package is sent to the provider from a public terminal, and that a hash of the query is generated and is included in the information contained in the query package.

A further aspect of the present invention is that a symmetric key of the user is generated and the query package is constructed in a manner that a first part including at least the query is encrypted using the generated symmetric key of the user and a second part including at least the generated symmetric key of the user is encrypted using the public key of the provider.

From the point of view of the information provider, the present invention is directed to a method for secure response by a provider to an anonymous query from a user in which:

an electronic encrypted query package containing information including a query, a random number sequence, and a public key of the user is received via a network, the information including an identification of a public bulletin board for posting a message comprising the random number sequence in association with an encrypted response to the query, and the query package being structured such that the contained information can be obtained by the provider by operations including a decryption with the private key of the provider;

the private key of the provider is used to obtain the information in said query package;

the public key of the user is used to form an electronic encrypted response package containing a response to the query, said response package being structured such that the response to the query can be obtained by the user by operations including a decryption with the private key of the user; and a message comprising the random number sequence in association with the response package is posted to the identified public bulletin board.

Another aspect of the present invention from the point of view of the server is that a hash of the query is included in the information contained in the query package, and the method further comprises computing a hash of the query, and comparing the computed hash with the hash included in the information.

Still another aspect of the invention from the point of view of the server is that the query package is constructed in a manner that a first part including at least the query is encrypted using a symmetric key of the user and a second part including at least the symmetric key of the user is encrypted using the public key of the provider, and the method further comprises decrypting the second part of the query package using the private key of the provider to obtain at least the symmetric key of the user, and decrypting the first part of the query package using the symmetric key of the user to obtain at least the query.

The present invention also comprises a stored message on a public bulletin board responsive to an anonymous query, said message comprising a random number sequence and an associated encrypted electronic response package containing a response to the query, said response package being structured such that the response to the query can be obtained by the user by operations including a decryption with the private key of the user. Another aspect of the inventive stored message is that the response package is constructed in a manner that a first part including at least the response is encrypted using a symmetric key of the provider and a second part including at least the symmetric key of the provider is encrypted using a public key of a user who made the anonymous query.

Other objects, features and advantages of the present invention will become apparent upon perusal of the following detailed description when taken in conjunction with the appended drawing, wherein:

In a first particular embodiment, the present invention includes a method for secure anonymous querying by a user of a provider to whom a public key, private key pair is assigned, the public key of the provider being publicly obtainable by the user, the method comprising: formulating by the user of a query to be sent to the provider, generating by the user of a random number sequence, a public key of the user, and a corresponding private key of the user for sole use with said formulated query; forming an electronic encrypted query package by the user by operations including encryption with the public key of the provider obtained by the user, said electronic encrypted query package containing information including the formulated query, the generated random number sequence, the generated public key of the user, and an identification of a public bulletin board for posting a message comprising the random number sequence in association with an encrypted response to the query, and said query package being structured such that the contained information can be obtained by the provider by operations including a decryption with the private key of the provider; and sending by the user of the query package to the provider via a network in a manner that the user is not identifiable to the provider, wherein the generated private key and the generated random number sequence are retained by the user.

In a first aspect of the first particular embodiment, the method further comprises: receiving by the provider via a network said query package sent by the user; obtaining by the provider by operations including decryption with the private key of the provider the information in said query package; formulating by the provider of a response to the query; forming an electronic encrypted response package by the provider by operations include encryption with the public key of the user contained in said query package, said electronic encrypted response package containing the formulated response to the query, said response package being structured such that the response to the query can be obtained by the user by operations including a decryption with the private key of the user; posting by the provider of a message comprising the random number sequence in association with the response package to the identified public bulletin board; accessing the identified bulletin board by the user in order to download the response package associated with that message posted by the provider including the random number sequence generated by the user; and obtaining by the user by operations including decryption with the private key of the user of the response information in said response package.

In a second particular embodiment, the present invention includes a method for secure response by a provider, to whom a private key, public key pair is assigned, to an anonymous query from a user comprising: receiving by the provider via a network an anonymous electronic encrypted query package containing information including a query, a random number sequence generated by the user for sole use in the query package, a public key of the user generated by the user for sole use in the query package, and an identification of a public bulletin board for posting a message comprising the random number sequence in association with an encrypted response to the query, and said query package being structured such that the contained information can be obtained by the provider by operations including a decryption with the private key of the provider; obtaining by the provider by operations including decryption with the private key of the provider the information in said query package; formulating by the provider of a response to the query; forming an electronic encrypted response package by the provider by operations including encryption with the public key of the user contained in said query package, said electronic encrypted response package containing the formulated response to the query, said response package being structured such that the response to the query can be obtained by the user by operations including a decryption with the private key of the user; and posting by the provider of a message comprising the random number sequence in association with the response package to the identified public bulletin board.

In a third particular embodiment, the present invention includes a stored message on a public bulletin board responsive to an anonymous query to a provider by a user, said message comprising: a random number sequence provided by the user in the anonymous query for sole use in the anonymous query; and an associated encrypted electronic response package containing a response to the anonymous query, said response package being structured such that the response to the query can be obtained by the user by operations including a decryption with a private key of the user, the corresponding public of the user having been provided by the user in the anonymous query for sole use in the anonymous query.

DETAILED DESCRIPTION OF THE PREFERRED EMBODIMENTS

Figure 1:
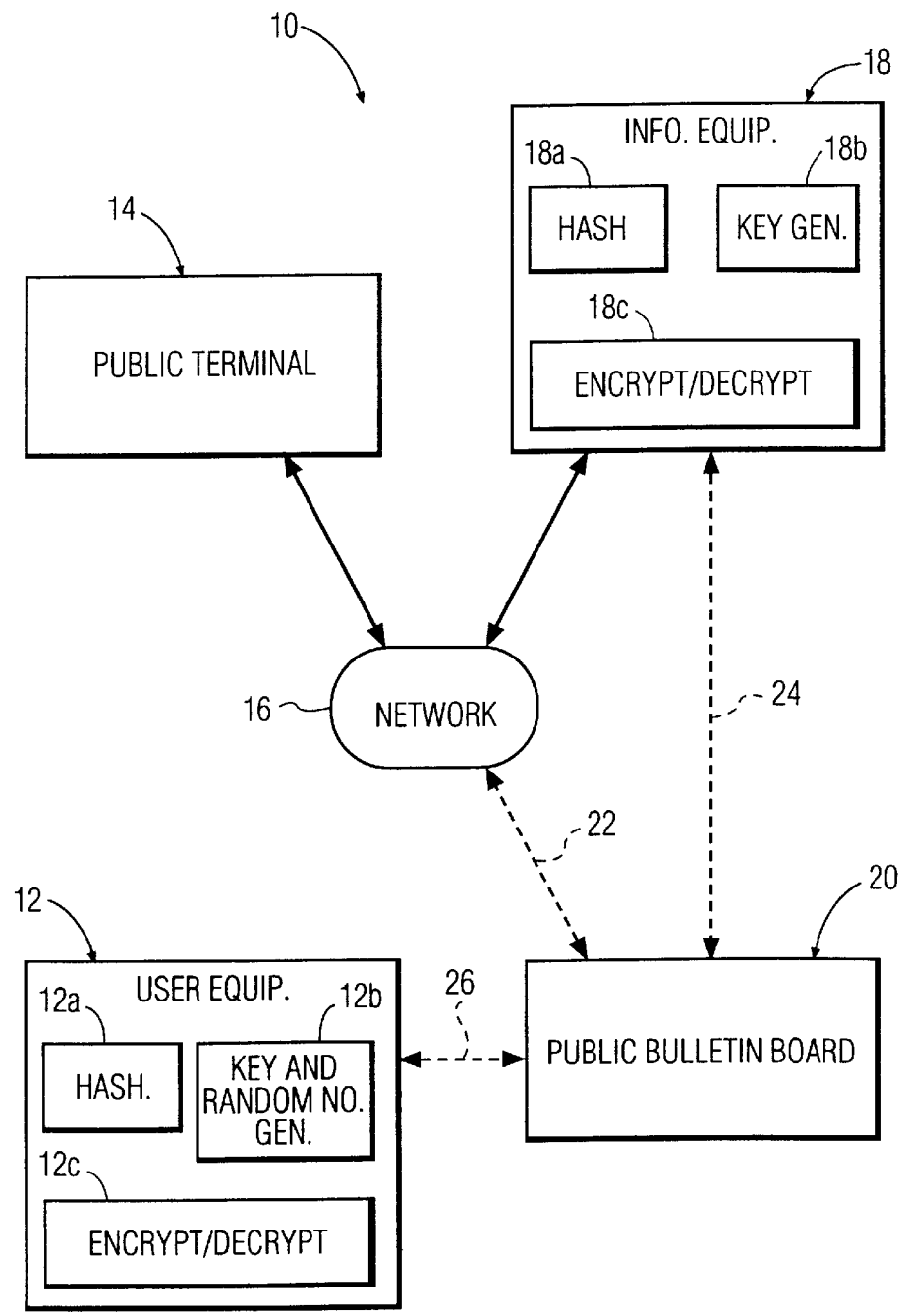
FIG. 1 is a schematic diagram which depicts a system including various equipment used by a user and an information provider to practice the inventive methods.
Figure 2:
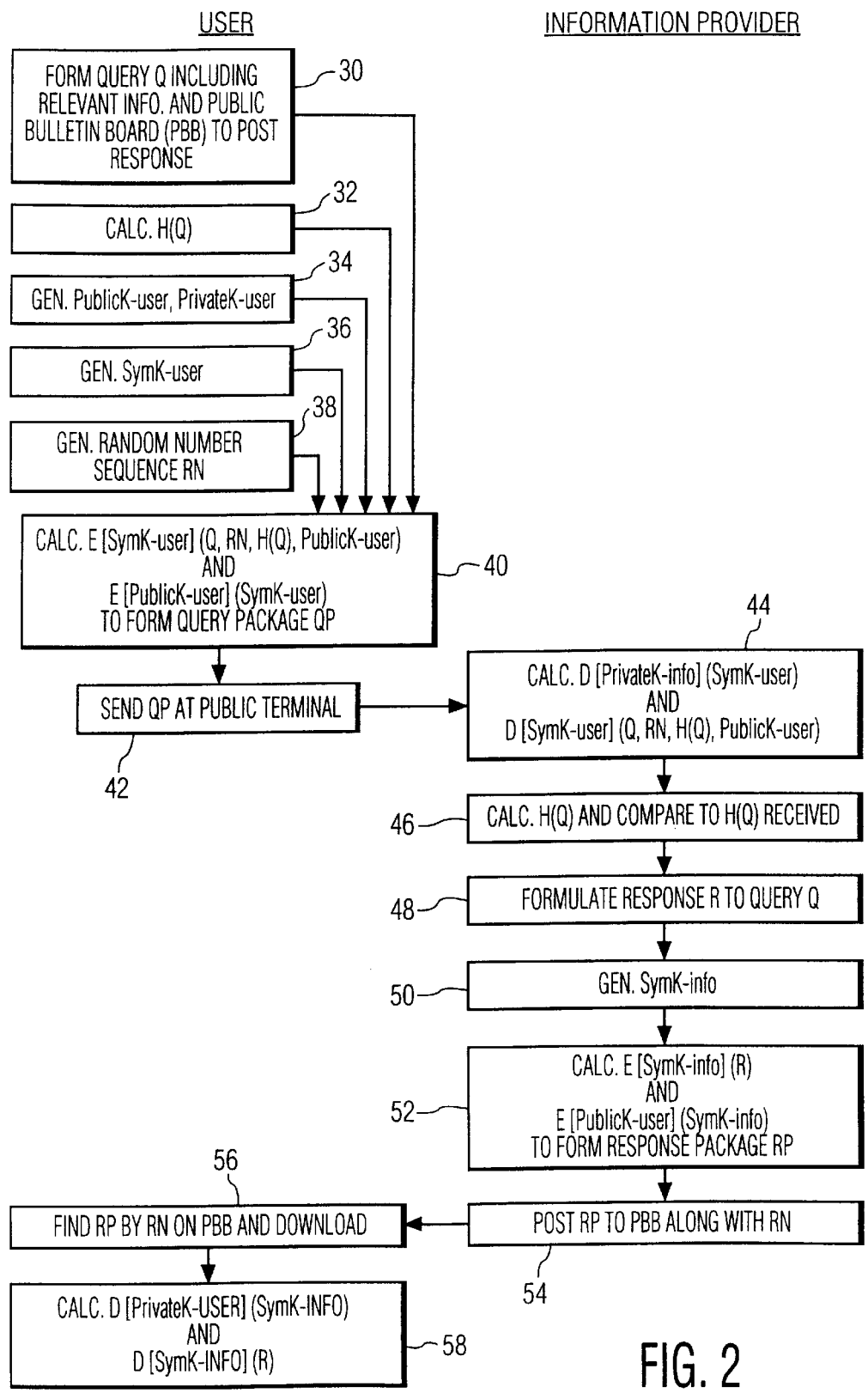
FIG. 2 is a flow chart showing in a left hand column the steps of the present invention which are carried out by equipment used by the user and in a right hand column the steps of the present invention carried out by the equipment used by the information provider.

Referring first to FIG. 1 of the drawing, the equipment used to carry out the present invention can be thought of a system 10 which on the user side comprises fixed or portable user equipment 12, such as a personal computer of the user, and public equipment 14 which may be remote from user equipment 12, such as a public terminal connected to a public network 16, for example the Internet, in order to send anonymous encrypted electronic mail messages to an information provider having information provider computer equipment 18 coupled to network 16. Referring also to FIG. 3, at user equipment 12 in step 30, the user formulates a query Q, for example of a medical nature which may include all relevant medical information of the user (symptoms, medical images, blood test results, history) in which information from which identity might be ascertained has been redacted. The query Q also includes an identification of a public bulletin board 20 to post an encrypted response. User equipment 12 further includes a hashing means 12*a*, a key and random number generator 12*b*, and encrypting/decrypting means 12*c*, all of which may be provided by software running on a CPU (not shown) in user equipment 12, which form from query Q an encrypted query package QP which constitutes the electronic mail message sent to the information provider.

Specifically, at step 32 hashing means 12*a* generates a hash H(Q) of query Q using a secure hash function, such as SHA-1 or RIPEMD, to produce a bit string which has a fixed predetermined length of at least 128 bits (160 bits if SHA-1 is used) which constitutes a "fingerprint" of query Q.

The public bulletin board, whose identification is included in the query, provides for transfer of response messages from the information provider to the user. As described subsequently, the information provider posts responses with associated identifying information (a generated random number) to the public bulletin board, and the user then retrieves and downloads the posted response associated with that user's particular identifying information (the users's generated random number).

Any network-accessible public bulletin known in the art and providing for no more than message posting and retrieval can be used in this invention. Such a bulletin board is advantageously identified in the query by its network address, such as a dial-in phone number, or an Internet address, or a worldwide web address, or so forth. This invention can then be adapted to and can utilize whatever message posting and retrieval facilities are provided by the particular public bulletin board. Accordingly, the invention can use older dial-in bulletin boards, or newer Internet accessible bulletin-boards, or e-mail exchanges, or news groups, or chat rooms, or so forth without limitation, all of which are well-known to those of ordinary skill. Further, at steps 34, 36, and 38, key and random number generator 12*b* generate a public key/ private key pair (PublicK-user, PrivateK-user), a symmetric key (SymK-user) and a random number (RN), respectively, all for use solely for the purpose of the present query. The public key/private key pair (PublicK-user, PrivateK-user) is preferably generated using the RSA algorithm in a known manner, although the El Gamal algorithm or elliptic curve cryptography may be utilized. The symmetric key SymK-user is essentially a generated random number. The symmetric key SymK-user is preferably at least 128 bits in length, and the random number RN is preferably 256 bits in length. At step 40, query package QP consisting of two parts is formed. The first part is calculated by encrypting with a symmetric algorithm using the generated symmetric key SymK-user, the information consisting of query Q, random number RN, hash H(Q), and public key PublicK-user; it is represented as follows:

E[SymK-user](Q, RN, H(Q), PublicK-user).

The second part of query package QP consists of the result of encrypting the symmetric key SymK-user with the aforementioned public key algorithm using the public key of the information provider PublicK-info, and is represented as follows:

E[PublicK-info](SymK-user).

In an embodiment where the well-known Rivest-Shamir-Adelman (RSA) encryption algorithm is used, although random numbers alone cannot be used as public or private keys, necessary keys are efficiently generated from random numbers. Essentially, as is well-known to those of ordinary skill, such keys can be determined by generating random numbers and testing them for particular properties in accord with the RSA algorithm. See, for example, Stallings, 1995, pages 126–127. Thereby, key and random number generator 12*b* can generate and can be utilized to generate random numbers, symmetric keys, and public/private key pairs.

To assure the correctness of the latter public key, it is assumed that the user has previously obtained a certificate signed by a trusted authority. The symmetric key SymK-user is utilized to encrypt the query Q, random number RN, hash H(Q), and public key PublicK-user because the encryption, and decryption needed to be done at the information provider is orders of magnitude more computationally efficient than would be the case if this possibly extensive information were directly encrypted using the public key PublicK-info of the information provider. Therefore a so-called "RSA package" is formed in which the symmetric key can first be decrypted at the information provider end using the information provider's private key PrivateK-info.

Rather, than sending the query package as an electronic message directly from user equipment 12 to the information provider via network 16, which would cause the header information in the message to identify the electronic address of the source, preferably the query package QP is saved to a diskette or other suitable media and carried by the user to the location of a public terminal 14 at which the diskette is accessed in order to, in step 42, anonymously mail the saved query package QP by electronic mail from public terminal 14 to the information provider. It is assumed that the public terminal 14 is configured to accomplish this without requiring the entry of any identifying information or actual reply address of the user.

At information provider equipment 18, the query package QP is received, and in step 44 decryption operations are successively calculated by encryption/decryption means 18*c* in order to decrypt the second part of query package QP to obtain the symmetric key SymK-user, which is then used to decrypt the first part of query package QP to obtain query Q, random number sequence RN, hash H(Q), and public key PublicK-user. These successive operations are represented as follows:

D[PrivateK-info](SymK-user)
D[SymK-user](Q, RN, H(Q), PublicK-user)

Then in step 46, the same secure hash function as used to calculate H(Q) at step 32 by hashing means 12*a* of user equipment 12 is applied by hashing means 18*a* in information provider equipment 18 to the decrypted query Q. The hash result H(Q) thus obtained is compared with the decrypted hash H(Q). If the compared items are equal, the integrity of the received query package QP is considered verified, and the succeeding step 48 is taken in which a response R is formulated in response to query Q. Further, in step 50, a symmetric key SymK-info is generated by key generator 18*b* of user equipment 18 as a random number preferably 256 bits in length.

Thereafter, in step 52, a response package RP is formed by encrypting the response R using the generated symmetric key SymK-info to form a first part of response package RP and encrypting the symmetric key SymK-info using the user's public key PublicK-user to form a second part of response package RP. Response package RP is thus constituting by the following two parts:

E[SymK-info](R)
E[PublicK-user](SymK-info).

In step 54 the response package RP is posted to the public bulletin board 20 named in query Q in association with random number sequence RN. This posting is accomplished either via a connection 22 between public bulletin board 20 and network 16 or via a direct dial-up telephone line modem connection 24 which can be established between information provider equipment 18 and public bulletin board 20.

Public bulletin board 20 is accessed by the user either from public terminal 14 via network 16 and connection 22, or from user equipment 12 via a direct dial-up telephone line modem connection 26 which can be established between user equipment 12 and public bulletin board 20. The posted response package RP is found by the associated random number sequence RN and is downloaded by the user. If the user is accessing the public bulletin Board at public terminal 14, response package RP is saved to a diskette or other suitable storage medium and taken to the location of user equipment 12. At user equipment 12, in step 58 response package RP is decrypted by first using the user's private key PrivateK-user to obtain the information provider's generated symmetric key SymK-info from the second part of response package RP, and then using the obtained symmetric key SymK-info to obtain the response R. The successive decryption operations are represented as follows:

D[PrivateK-user](SymK-info)
D[SymK-info] (R).

It should be apparent that the objects of the present invention have been satisfied in that methods have been described for providing for secure anonymous queries and replies. While the present invention has been described in particular detail, it should also be appreciated that numerous modifications are possible within the intended spirit and scope of the invention.

What is claimed is:

1. A method for secure anonymous querying by a user of a provider to whom a public key, private key pair is assigned, the public key of the of the provider being publicly obtainable by the user, the method comprising:

formulating by the user of a query to be sent to the provider, generating by the user of a random number sequence, a public key of the user, and a corresponding private key of the user for sole use with said formulated query;

forming an electronic encrypted query package by the user by operations including encryption with the public key of the provider obtained by the user, said electronic encrypted query package containing information including the formulated query, the generated random number sequence, the generated public key of the user, and an identification of a public bulletin board for posting a message comprising the random number sequence in association with an encrypted response to the query, and said query package being structured such that the contained information can be obtained by the provider by operations including a decryption with the private key of the provider; and sending by the user of the query package to the provider via a network in a manner that the user is not identifiable to the provider, wherein the generated private key and the generated random number sequence are retained by the user.

2. The method as claimed in claim 1, wherein the query package is sent by the user to the provider from a public terminal.

3. The method as claimed in claim 1, further comprising generating a hash of the query by the user, and wherein said electronic encrypted query package contains information further including the generated hash of the query.

4. The method as claimed in claim 1, further comprising generating a symmetric key by the user, and wherein forming said electronic encrypted query package further comprises encrypting a first part including at least the query using the generated symmetric key of the user and encrypting a second part including at least the generated symmetric key of the user using the public key of the provider.

5. The method as claimed in claim 3, further comprising generating a symmetric key by the user, and wherein forming said electronic encrypted query package further comprises encrypting a first part including at least the query using the generated symmetric key of the user and encrypting a second part including at least the generated symmetric key of the user using the public key of the provider.

6. A method for secure response by a provider, to whom a private key, public key pair is assigned, to an anonymous query from a user comprising:

receiving by the provider via a network an anonymous electronic encrypted query package containing information including a query, a random number sequence generated by the user for sole use in the query package, a public key of the user generated by the user for sole use in the query package, and an identification of a public bulletin board for posting a message comprising the random number sequence in association with an encrypted response to the query, and said query package being structured such that the contained information can be obtained by the provider by operations including a decryption with the private key of the provider;

obtaining by the provider by operations including decryption with the private key of the provider the information in said query package;

formulating by the provider of a response to the query, forming an electronic encrypted response package by the provider by operations including encryption with the public key of the user contained in said query package, said electronic encrypted response package containing the formulated response to the query, said response package being structured such that the response to the query can be obtained by the user by operations including a decryption with the private key of the user; and posting by the provider of a message comprising the random number sequence in association with the response package to the identified public bulletin board.

7. The method as claimed in claim 6, wherein a hash of the query is included by the user in the information contained in the query package, and the method further comprises computing by the provider of a hash of the query, and comparing by the provider of the computed hash with the hash included in the information contained in the query package.

8. The method as claimed in claim 6, wherein the query package is constructed by the user in a manner such that a first part including at least the query is encrypted using a symmetric key of the user and a second part including at least the symmetric key of the user is encrypted using the public key of the provider, and the method further comprises decrypting by the provider of the second part of the query package using the private key of the provider to obtain at least the symmetric key of the user, and decrypting by the provider of the first part of the query package using the symmetric key of the user to obtain at least the query.

9. The method as claimed in claim 7, wherein the query package is constructed by the user in a manner such that a first part including at least the query is encrypted using a symmetric key of the user and a second part including at least the symmetric key of the user is encrypted using the public key of the provider, and the method further comprises decrypting by the provider of the second part of the query package using the private key of the provider to obtain at least the symmetric key of the user, and decrypting by the provider of the first part of the query package using the symmetric key of the user to obtain at least the query.

10. The method as claimed in claim 6, further comprising generating a symmetric key by the provider, and wherein forming the electronic encrypted response package further comprises encrypting a first part including at least the response using the symmetric key of the provider and encrypting a second part including at least the symmetric key of the provider using the public key of the user.

11. The method as claimed in claim 7, further comprising generating a symmetric key by the provider, and wherein forming the electronic encrypted response package further comprises encrypting a first part including at least the response using the symmetric key of the provider and encrypting a second part including at least the symmetric key of the provider using the public key of the user.

12. The method as claimed in claim 8, further comprising generating a symmetric key by the provider, and wherein forming the electronic encrypted response package further comprises encrypting a first part including at least the response using the symmetric key of the provider and encrypting a second part including at least the symmetric key of the provider using the public key of the user.

13. A stored message on a public bulletin board responsive to an anonymous query to a provider by a user, said message comprising a random number sequence provided by the user in the anonymous query for sole use in the anonymous query, and an associated encrypted electronic response package containing a response to the anonymous query, said response package being structured such that the response to the query can be obtained by the user by operations including a decryption with a private key of the user, the corresponding public of the user having been provided by the user in the anonymous query for sole use in the anonymous query.

14. The stored message as claimed in claim 13, wherein the response package is constructed in a manner that a first part including at least the response is encrypted using a symmetric key of the provider and a second part including at least the symmetric key of the provider is encrypted using a public key of a user who made the anonymous query.

15. The method of claim 1 further comprising accessing the identified bulletin board by the user in order to download the response package associated with that message posted by the provider including the random number sequence generated by the user, and obtaining by the user by operations including decryption with the private key of the user of the response information in said response package.

16. The method of claim 1 further comprising receiving by the provider via a network said query package sent by the user, obtaining by the provider by operations including decryption with the private key of the provider the information in said query package, formulating by the provider of a response to the query, forming an electronic encrypted response package by the provider by operations include encryption with the public key of the user contained in said query package, said electronic encrypted response package containing the formulated response to the query, said response package being structured such that the response to the query can be obtained by the user by operations including a decryption with the private key of the user, posting by the provider of a message comprising the random number sequence in association with the response package to the identified public bulletin board, accessing the identified bulletin board by the user in order to download the response package associated with that message posted by the provider including the random number sequence generated by the user, and obtaining by the user by operations including decryption with the private key of the user of the response information in said response package.

* * * * *